United States Patent [19]
Momiyama et al.

[11] Patent Number: 5,301,766
[45] Date of Patent: Apr. 12, 1994

[54] POWER STEERING AND LIMITED SLIP DIFFERENTIAL SYSTEM

[75] Inventors: Fujio Momiyama; Noriaki Tokuda; Kenichi Ohmori; Kohji Harada; Shinichi Oku, all of Hino, Japan

[73] Assignee: Hino Jidosha Kogyo Kabushiki Kaisha, Tokyo, Japan

[21] Appl. No.: 694,359

[22] Filed: May 1, 1991

[30] Foreign Application Priority Data

May 7, 1990 [JP] Japan .................. 2-117403

[51] Int. Cl.$^5$ .............................................. B62D 5/07
[52] U.S. Cl. ................................. 180/197; 180/132; 180/152; 475/86; 475/231
[58] Field of Search ............... 180/132, 141, 142, 143, 180/245, 246, 234, 152, 197; 475/231, 238, 86, 249, 257

[56] References Cited

U.S. PATENT DOCUMENTS

| | | | |
|---|---|---|---|
| 3,584,537 | 6/1971 | Schulz | 180/152 |
| 3,604,528 | 9/1971 | Williamson | 180/153 |
| 3,657,888 | 4/1972 | Zirps | 180/153 |
| 5,058,700 | 10/1991 | Shibahata | 180/245 |
| 5,078,226 | 1/1992 | Inagaki | 180/132 |
| 5,111,901 | 5/1992 | Bachhuber et al. | 180/142 |
| 5,161,636 | 11/1992 | Haupt et al. | 475/86 |
| 5,172,787 | 12/1992 | Kobayashi | 180/197 |

Primary Examiner—Margaret A. Focarino
Assistant Examiner—Anne Marie Boehler
Attorney, Agent, or Firm—Staas & Halsey

[57] ABSTRACT

A power steering and limited slip differential system is provided with a main booster generating a steering effort for front wheels, a directional control valve having a pair of reaction chambers and a friction clutch disposed between a differential gear mechanism and a driving wheel axle for rear wheels and is further added with an auxiliary booster generating a compensation steering effort for the front wheels and a clutch control air cylinder for coupling and decoupling the friction clutch. In the system, an injection pressure control valve injects compensating pressure oil into the auxiliary booster and the reaction chambers of the directional control valve in response to a vehicle speed and steering effort at the beginning of steering and steering back and concurrently controls the pressure of the injected compensating pressure oil, and a pressure air control valve charges and discharges operating compressed air to and from the clutch control air cylinder in response to the vehicle speed and the steering angle of the front wheels, and further in response to the slipping at one side and the both sides of the rear wheels and thereby controls the air pressure of the clutch control air cylinder.

18 Claims, 20 Drawing Sheets

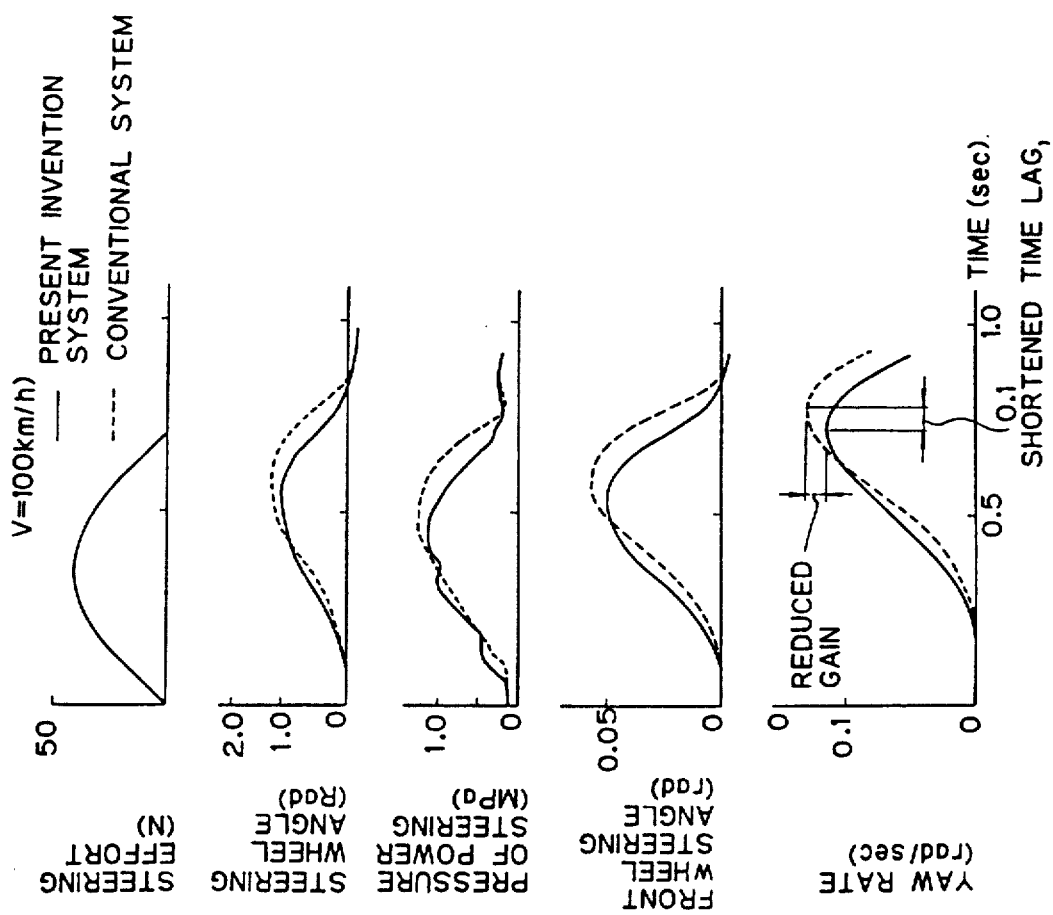
Fig. 10
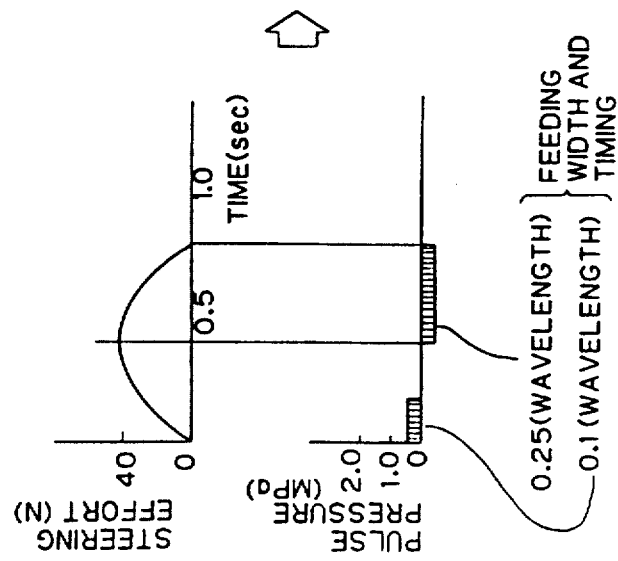

(1) FOR CONTROLLING STEERING GAIN (2) FOR CONTROLLING STEERING PHASE-LAG (3) FOR CONTROLLING TRACTIVE FORCES TO REDUCE STEERING WEAVE

POWER STEERING AND LIMITED SLIP DIFFERENTIAL SYSTEM

BACKGROUND OF THE INVENTION

1. Field of the Invention

This invention relates to a power steering and limited slip differential system suitable for vehicles, in particular, for trucks and buses.

2. Description of the Related Art

Generally, phase lag and gain of a vehicle's handling response increases with vehicle speed. Excessive phase lag will cause delay in the vehicle reaching the driver's intended course, resulting in oversteering, while excessive gain will intensify the oversteering, making the vehicle weave.

Further, high phase lag will also increase the time required for disturbance, such as road surface roughness, to be transmitted to the driver's hand on the steering wheel as a response, delaying corrective steering and producing steering wheel weave. In the case of trucks and buses, the phase lag magnitude in particular can reach four or five times that of passenger cars.

Still further, expressways in the middle of the night are analogous to huge belt conveyers filled up with groups of trucks. These trucks are flowing towards the metropolitan Tokyo and arrive at wholesale markets etc. before dawn. A between car distance in these truck groups is generally short and the speed thereof is high. Further, highway bus services between cities are spotlighted. Because of their advantages such as inexpensive fares and ease of use, living space with a high sense and high quality, and attentive services, not only the night bus services which were understood at the beginning to supplement railway train services, but also day time highway bus services are increasing. As such, on one hand, the demand for high speed and long distance services by the trucks and buses is increasing, however, on the other hand, in particular, with regard to trucks, a shortage of truck drivers is serious, and in addition, age of the drivers has been increasing.

For these reasons, there appears an indication of woman driver expansion.

Further, the higher the speed of a vehicle is, the more the response performance thereof reduces. Still further, according to W. Woodson and D. Conover, *Human Engineering Guide for Equipment Designers* 6-11, 6-20 (1973), physiological abilities relating to driving skill of advanced age drivers and women drivers are relatively low in comparison with that of young men (see FIG. 1).

Therefore, a system is desired which realizes a compensation for the decrease in the response performance at high speed region and the physiological ability differences of the drivers within the vehicle. Moreover, large sized vehicles which necessitate relatively wide space on the running road in comparison with passenger cars have to be provided with an even better response performance than passenger cars.

Further, with regard to desirable vehicle response characteristics, a vehicle's controllability and stability have to be investigated from both the vehicle response performance in association with driver's handling and the vehicle response performance in association with disturbances such as those caused by roughness of the road surface.

First, with regard to the handling response characteristic, a factor $T\beta$ is defined as the product of the time constant and yaw gain. The smaller the factor is, the higher is the subjective judgment of drivers. There is an optimum region of course tracking characteristic in a range of small time constants and of certain amounts of yaw acceleration gain.

These facts concern passenger cars, however, these passenger car tendencies are similar in trucks and buses. FIG. 2 shows an example of the response characteristic of a truck and bus.

The truck is equipped with a front engine and leaf suspensions, while the bus is equipped with a rear engine and air suspensions, and the gain and phase lag of the truck are smaller than those of the bus. Further, the subjective judgment from the driver's viewpoint of the truck is better than the bus.

These gain and phase lag increase in response to an increase of the vehicle speed and thereby the burdens to drivers increase. This suggests that a desirable handling response region will be achieved by reducing both the gain and phase lag smaller than those now.

This tendency meets with the previous tendency with regard to the passenger car data, when the phase lag is assumed to belong to the time constant property. When the phase lag is large, approach to an aimed course by a driver is delayed so that an oversteering is caused, and when the gain is much larger, the oversteering is amplified so that the vehicle weaves. Still further, the problems arising from the physiological ability differences can be compensated for by reducing the time constant in the steering system.

Nextly, with regard to disturbance response characteristics, it is desirable to reduce the effects caused by disturbances as much as possible. For example, the irregularity of the road surface causes displacement of the axles and the chassis in succession. The displacement is sensed by the driver, and thereafter the driver's corrective steering begins. A smaller delay until the corrective steering and greater damping of the disturbances are desirable. However, if the disturbances can be intercepted at the onset so as not to permit their entry, such is considered the best way.

Further, with regard to the handling response, when the handling response performance of trucks and buses is compared with that of passenger cars, there is a significant difference in connection with the phase lag, which is very large in trucks and buses (see FIG. 3). For analyzing what causes the phase lag to be so large, the time lag from the initiation of steering operation to the beginning of the course change of the vehicle was measured along its transfer route (see FIGS. 4 and 7).

As the result, it was found that the time lag in the steering system occupies 50% of the total time lag. Further, with regard to the chassis system, the time lag of buses is larger than that of trucks, the reasons of which are considered to be due to influences such as their suspension structure differences and weight allotment differences to the front and rear axles.

These trucks and buses employ common steering systems so that, with regard to the time lag in their steering systems, there is no difference.

Further, several studies reported to have shortened the time lag in the steering system which amounts to 60% among the total time lag. Some of these went further to suggest specific system structures but failed to reach practical uses.

Two reasons are presumed for the failures. One is that it is presumed that the phase lag was shortened, however concurrently the gain gets large, and thereby the steering wheel becomes sensitive and the handling feeling is deteriorated. The other is that it is presumed that since the mechanical coupling between the steering wheel and the front wheels has been disconnected, problems in connection with safety are unsolved.

In view of the above, such measures are required that reduce phase lag without increasing the time lag and without disconnecting the mechanical coupling.

On the other hand, with regard to the disturbance response, as indicated above, the disturbances should be intercepted at the onset. In other words, it is desirable to intercept the entering of disturbance at the tires from which the disturbances intrude. The countermeasures thereto are the compliance steering control of the rear wheels and the torque split control between the right and left rear wheels and, in particular, in case of the rigid rear axle structure with leaf springs which is employed in many large commercial vehicles, the torque split control is preferable.

SUMMARY OF THE INVENTION

It is therefore an object of the present invention to provide a power steering and limited slip differential system which enhances handling response performance and disturbance response performance to thereby enhance the control stability of vehicles.

In connection with the above described object, the power steering and limited slip differential system according to the present invention resides in the inclusion of a main booster which generates a steering effort for front wheels. An auxiliary booster which generates a compensating steering effort for the front wheels. A directional control valve which has a pair of reaction chambers and which controls the direction of operating pressure oil which is supplied from a hydraulic pump to the main booster and concurrently discharged from the main booster to an oil reservoir. A pressure oil setting valve sets the pressure of the operating pressure oil supplied to the main booster, and the pressure of compensating pressure oil supplied to the auxiliary booster and the reaction chambers of the directional control valve. An injection pressure control valve injects the compensating pressure oil into the reaction chambers of the directional control valve and the auxiliary booster in response to a vehicle speed and the steering effort at the beginning of steering and steering back in the handling, and concurrently controls the pressure of the injected compensating pressure oil. A friction clutch is disposed between the differential case of a differential gear mechanism and a driving wheel axle for rear wheels. A clutch control air cylinder is provided for coupling and decoupling the friction clutch. An air pressure control valve charges and discharges operating compressed air to and from the clutch control air cylinder in response to the vehicle speed and the steering angle of the front wheels, and further in response to the slipping of one side and the both sides of the rear wheels, and controls the air pressure of the clutch control air cylinder.

Further, in the power steering and limited slip differential system according to the present invention, the pressure of the compensating pressure oil which is injected into the reaction chambers of the directional control valve and the auxiliary booster is increased by the injection pressure control valve in response to the rise of the vehicle speed and the increase of the differential value in the steering effort to perform compensation for the steering delay in the handling, which reduces the phase lag without increasing the gain. The air pressure of the clutch control air cylinder, with the air pressure control valve, is reduced in response to the increase of the vehicle speed and the increase of the front wheel steering angle in a low speed region, is raised in response to the increase of the vehicle speed and the decrease of the front wheel steering angle in a high speed region, is raised in response to the slip of one side of the rear wheels in a low vehicle speed, and is reduced in response to the slip of the both sides of the rear wheels in a low vehicle speed. Controlling the air pressure serves to limit differential action and to increase and decrease driving force which suppresses interference to the running of the vehicle. It also helps the vehicle avoids problems caused by road surface having a small road surface friction coefficient $\mu$, and reduces side slips.

BRIEF DESCRIPTION OF THE DRAWINGS

FIG. 6 is a compendium of graphs illustrating for comparison and verification on the data of an actual vehicle and the result of simulation, FIG. 10 is a compendium of graphs illustrating final simulation results with regard to the pressure oil injection timing and width.

DESCRIPTION OF THE PREFERRED EMBODIMENT

Figure 1:
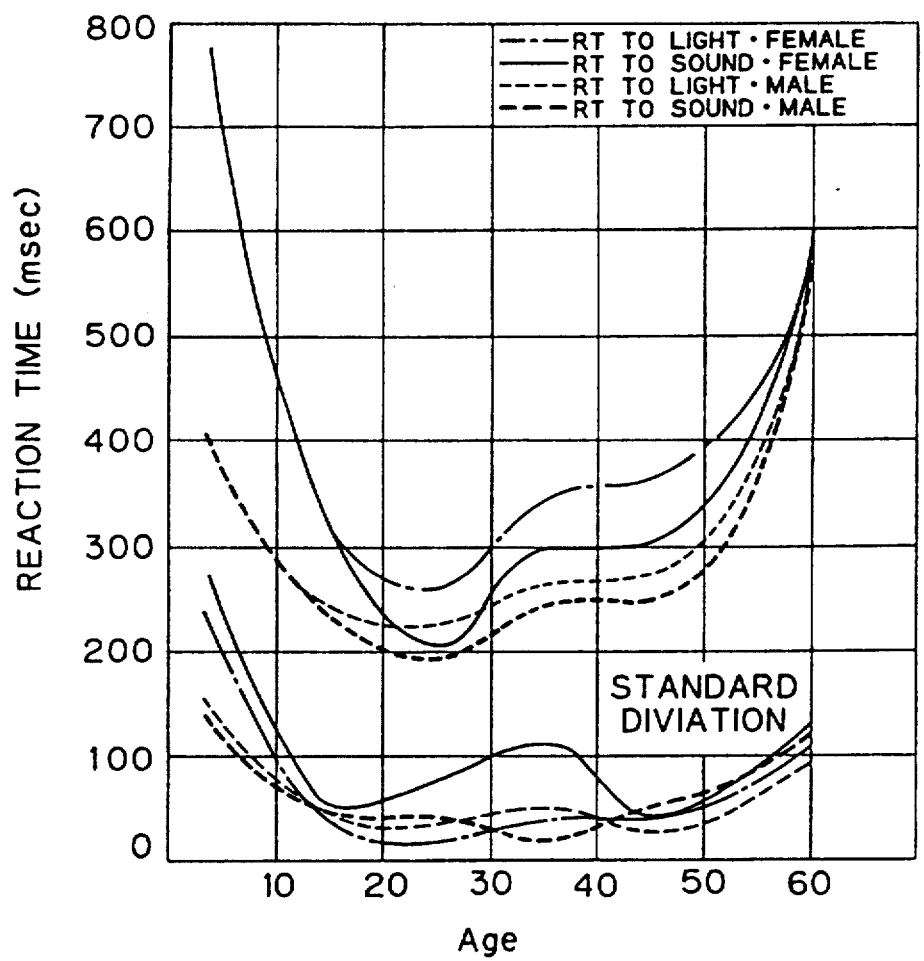
FIG. 1 is a graph illustrating difference in response time to light and sound stimulus by gender and age.
Figure 2:
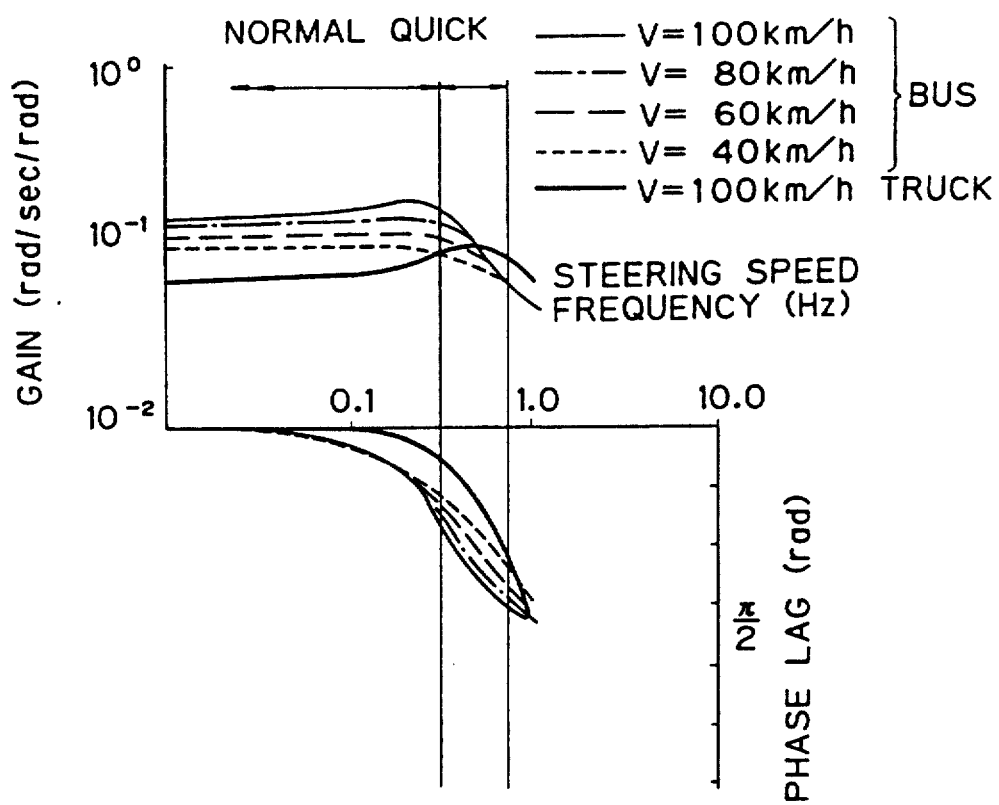
FIG. 2 is a graph illustrating difference in yaw rate response between a truck and bus.
Figure 3:
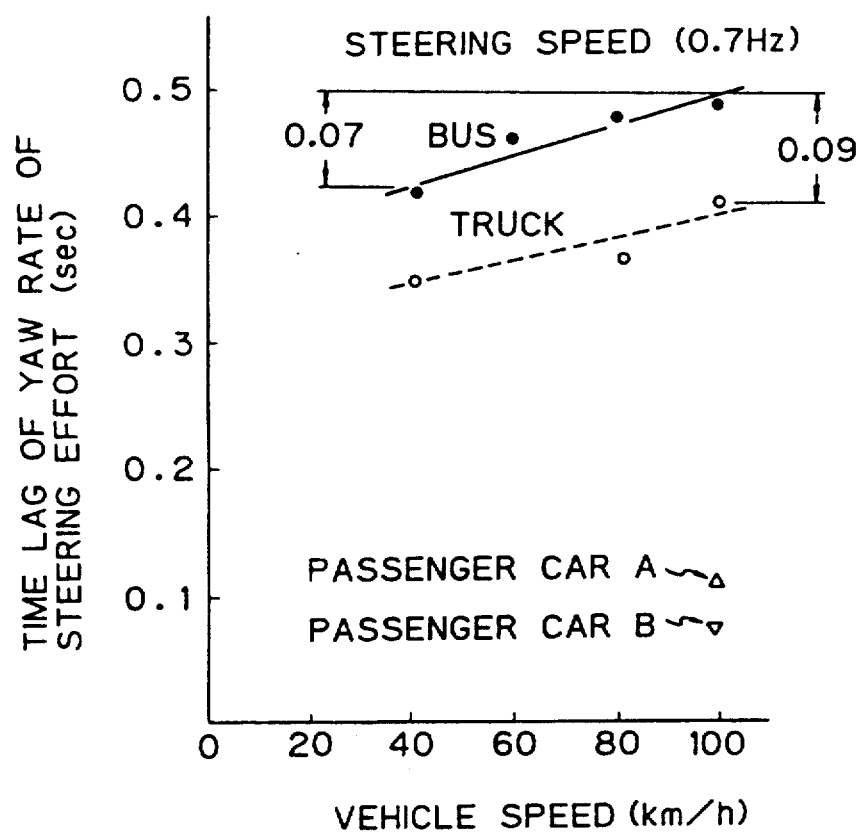
FIG. 3 is a graph illustrating difference in time lag of yaw rate response in a truck, bus and passenger car.
Figure 4:
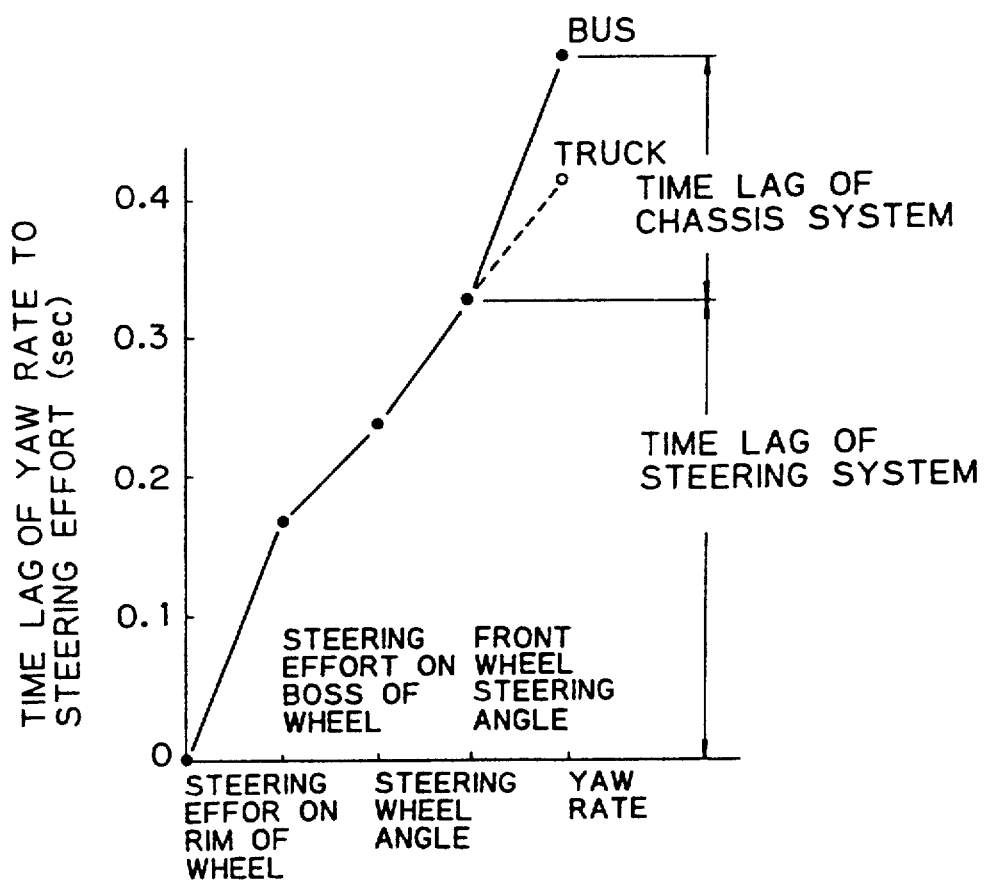
FIG. 4 is a graph illustrating the share of time lag by a steering system and a chassis.

Hereinbelow, a specified concrete embodiment of a power steering and limited slip differential system according to the present invention will be described with reference to the drawings.

FIGS. 6, 13, 14, 15, 16 and 17 show the concrete embodiment of the power steering and limited slip differential system 10 according to the present invention which is applied to a rear-mounted engine bus.

The system 10 is comprised of a power steering arrangement 11 and a limited slip differential arrangement 12. The power steering arrangement 11 comprises a main booster 14, an auxiliary booster 15, a directional control valve 16, a pressure oil setting valve 17, injection pressure control valves 18, 19, a reaction adjusting valve 20, a hydraulic pump 21 provided with an oil reservoir, and a steering wheel 23 which provides a steering input to the directional control valve 16. The limited slip differential arrangement 12 comprises a differential gear mechanism 25 combined with a reduction gear mechanism 91, a friction clutch 26, a clutch control air cylinder 27, an air pressure control valve 28, an air tank 29, and a safety valve 30. The power steering arrangement 11 and limited slip differential arrangement 12 are assembled to facilitate an electronic control with a microcomputer 13. The microcomputer 13 electrically connects at its input side with a vehicle speed sensor 31, a steering effort sensor 32, a wheel rotation sensors 33, 34, 35, 36, a pressure sensor 37, a manual switch 38 and a brake switch 39 and electrically connects at its output side with the solenoid coils (not shown) of the injection pressure control valves 18, 19. The electric actuator (not shown) of the air pressure control valve 28 respectively controls the power steering arrangement 11 so as to perform a steering operation in which a steering delay compensation is added which reduces the phase lag without increasing the gain, and controls the limited slip differential arrangement 12 so as to limit the differential action and to increase and decrease the driving force (transferred torque), further, concurrently, with the power steering arrangement 11 to lighten the power steering effort during stationary steering and a low speed running, and to change the handling response feeling into a level of somewhat heavier steering effort during a high speed running.

The main booster 14 incorporates the directional control valve 16, generates steering effort for front wheels 121, 122 and is constructed into an integral type which enables manual steering.

The main booster 14 includes a cylinder body 40 inside of which a cylinder bore 41 is formed, a rack piston 42 fitted in the cylinder bore 41 permitting slidable reciprocation to form a pair of cylinder chambers 43, 44 in the cylinder bore 41 and a sector gear (not shown) engaging the rack of the rack piston 42. Main booster 14 is link-coupled to the front wheels 121, 122 via a pitman arm 45 fixedly coupled to the shaft (not shown) of the sector gear and a link mechanism 46. Of course, oil ports 47, 48, which open to the corresponding cylinder chambers 43, 44, are formed at the cylinder body 40.

The auxiliary booster 15 is constructed into a double acting type cylinder which generates an auxiliary steering effort for the front wheels 121, 123.

The auxiliary booster 15 includes a cylinder body 49 inside of which a cylinder bore (not shown) is formed, a piston (not shown) fitted in the cylinder bore permitting slidable reciprocation to form a pair of cylinder chambers (not shown) in the cylinder bore, and a piston rod 50, one end of which is fixedly connected to the piston and the other end of which extends out of the cylinder body permitting pulling in and out thereof. The other end of the piston rod 50 is link-coupled to the front wheels 121, 122 via link mechanism 46a. Of course, oil ports 51, 52, which open to the corresponding pair of cylinder chambers, are formed at the cylinder body 49.

The directional control valve 16 is provided with a pair of reaction chambers 56, 57, is incorporated into the cylinder body 40 of the main booster 14, and is constructed as a hydraulic reaction type spool valve in which a spool 55 is shifted by a shift shaft (not shown) secured to the input axis (not shown) which is connected to the steering shaft 24. The operating pressure oil is direction-controlled and is supplied from the hydraulic pump 21 to the main booster 14 via a supply side pressure oil piping 74 and concurrently is exhausted from the main booster 14 to the oil reservoir 22 via a return side oil pressure piping 75.

The directional control valve 16 includes a valve body 53 inside of which a valve bore 54 is provided and incorporated into the cylinder body 40 of the main booster 14, the spool 55 fitted in the valve bore 54 permitting slidable reciprocation to form the pair of reaction chambers 56, 57. The spool 55 is slidably moved inside the valve bore 54 by the steering wheel 23 via the steering shaft 24, input axis, and the shift shaft and direction, which controls the operating pressure oil so that it flows from the hydraulic pump 21 to either of the cylinder chambers 43, 44 in the main booster 14 via the supply side pressure oil piping 74 and concurrently from another of the cylinder chambers 43, 44 in the main booster 14 to the oil reservoir 22 via the returning pressure oil piping 75 respectively, and in that instance, the amount of steering in the main booster 14 is fed back.

Further, in the valve body 53 of the directional control valve 16, a pump port 58, tank ports 59, 60, cylinder ports 61, 62, reaction ports 63, 64, and injection ports 65, 66 which open to the valve bore 54 are formed at predetermined positions. The pump port 58 is connected to the supply side pressure oil piping 74 and the tank ports 59, 60 to the returning side pressure oil piping 75 respectively and further, the cylinder ports 61, 62 are connected to the corresponding oil ports 47, 48 via communicating channels 67, 68.

Still further, in the spool 55 of the directional control valve 16, reaction communicating ports 69, 70 are formed which supply the operating pressure oil into either of the reaction chambers 56, 57 from the hydraulic pump 21 in response to the shift direction of the spool 55 and return the operating pressure oil from another of the reaction chambers 56, 57 to the oil reservoir 22, when the spool 55 is shifted within the valve bore 54.

The pressure oil setting valve 17 is disposed in the supply side pressure oil piping 74 at the upstream side of the directional control valve 16. Valve 17 sets the pressure of the operating pressure oil supplied to the main booster 14 and the pressure of the compensating pressure oil supplied to the auxiliary booster 15 and the chambers 56, 57 of the directional control valve 16.

The injection pressure control valves 18, 19 are linear solenoid valves and are disposed in compensating pressure oil pipings 76, 77, 78, 79, 80, 81, 82, 83 which connect the pair of cylinder chambers of the auxiliary booster 15 and the pair of reaction chambers of the directional control valve 16 to the hydraulic pump 21 and the oil reservoir 22, and further, the solenoid coils (not shown) thereof are electrically connected to the output side of the microcomputer 13.

Further, the injection pressure control valves 18, 19 carry out valve operation by the current provided from the microcomputer 13 in response to the running speed of the bus and steering effort applied to the steering wheel 23 at the beginning of steering and of steering back. At the beginning of steering, valves 18, 19, inject the compensating pressure oil into the cylinder chambers of the auxiliary booster 15 and the reaction chambers 56, 57 of the directional control valve 16 in their predetermined direction, and at the time of steering back inject the compensating pressure oil into the cylinder chambers of the auxiliary booster 15 and the reaction chambers 56, 57 of the directional control valve 16 in their predetermined direction. Valves 18, 19, as well control the pressure of the compensating pressure oil injected. Of course, in a normal condition, the injection pressure control valves 18, 19 connect the cylinder chambers of the auxiliary booster 15 to the oil reservoir 22 and as well interrupt the reaction chambers of the directional control valve 16 from the hydraulic pump 21 and the oil reservoir 22.

Still further, since the injection pressure control valves 18, 19 have such a structure that the compensating pressure oil is injected into the cylinder chambers of the auxiliary booster 15 and the reaction chambers 56, 57 of the directional control valve 16, orifices 71, 72 are disposed in the compensating pressure oil pipings 80, 81 in view of the relationship between the cylinder chambers of the auxiliary booster 15 and the reaction chambers 56, 57 of the directional control valve 16.

The reaction adjustment valve 20 is disposed in a bypass channel 73 communicating the pair of reaction chambers 56, 57 of the directional control valve 16 to each other. The electric actuator of valve 20 is electrically connected to the microcomputer 13.

Further, in the reaction adjustment valve 20, the electric actuator is driven by the current provided by the microcomputer 13, and the orifice thereof is adjusted so as to change the handling response in such a manner that the steering effort has a lighter feel during a stationary steering and a low speed running and the steering effort has a heavier feel during a high speed running.

The differential gear mechanism 25 is incorporated with the reduction gear mechanism 91 which includes a drive pinion 92 and a ring gear 93 engaged each other in the differential carrier 84. Gear mechanism 25 includes four differential pinions 88, 88 and a pair of differential side gears 89, 89 disposed in a differential case 86 in association with the reduction gear mechanism. Of course, the differential pinions 88, 88 are rotatably fitted at the both ends of spider 90. On the other hand, the differential side gears 89, 89 are spline-connected to driving wheel axles 119, 120 for the rear wheels 123, 124 and are engaged with the differential pinions 88, 88.

The friction clutch 26 is disposed between the differential case 86 and the driving wheel axle 119. Clutch 26 includes the bore 94 formed in the differential case 86, a clutch ring 96 forming the bore 94 of the differential case 86 spline-connected to the driving wheel axle 119 into a ring chamber 95, many external gear clutch plates 97 and internal gear clutch plates 98 alternatively arranged in the ring chamber 95 and a pressure ring 99 pushing the external and internal gear clutch plates 97, 98. Of course, this friction clutch 26 is assembled in a position in which the external gear clutch plates 97 are spline-covered with the differential case 86, and the internal gear clutch plates 98 are coupled with the clutch ring 96, respectively. The differential action of the differential gear mechanism is limited and the transfer torque of the driving wheel axles 119, 120 is controlled in the increasing and the decreasing direction.

The clutch control air cylinder 27 is incorporated into the differential case 86, is connected to the air tank 29 via pressurized air piping 111, and controls the friction clutch 26 to engage and disengage by charging and discharging the operating pressurized air supplied from the air tank 29.

This clutch control air cylinder 27 is embodied in an internal cylinder guiding type structure which includes a ring cylinder 100 which opens to the ring chamber 95 and is formed in the differential case 86, and a ring piston 102 which is fitted in the ring cylinder 100 while facing to the pressure ring 99 and permitting slidable reciprocation to form cylinder chamber 101 in the ring cylinder 100, and is assembled in such a manner that an air port 103 which opens to the cylinder chamber 101 is connected to the pressurized air piping 111 via a pressure air coupling 104. The operating pressurized air is charged from the air tank 29 to the cylinder chamber 101 and discharged from the cylinder chamber 101 to the air. By pressing and separating the external and internal gear clutch plates 97, 98 via the pressure ring 99, the clutch engagement and disengagement operation of the friction clutch 26 is carried out.

Of course, the pressure air coupling 104 is assembled together with a sealed slip ring 105 fitted onto a boss 87 of the differential case 86 so as to permit relative rotational movement thereto and is fitted into a ring gear boss 85 of a differential carrier 84 so as to prevent rotation thereto. An air lead pipe 106 connects the shield slip ring 105 to the pressurized air piping 111 outside the differential carrier 84, and comprises a pipe connector 107 and is connected to the pressurized air piping 111 via the pipe connector 107.

The air pressure control valve 28 is disposed in the pressurized air piping 111 which connects clutch control air cylinder 27 with the air tank 29, is driven by the current provided from the microcomputer 13 in response to the vehicle speed and the front wheel steering angle, and in response to the slipping at one side and both sides of the rear wheels, charges and discharges the operating compressed air to and from the clutch control air cylinder 27, and controls the air pressure of the clutch control air cylinder 27.

This air pressure control valve 28 is formed of a combination of a normally closed type two way solenoid valve 109 and a normally open type two way solenoid valve 110. In particular, the normally open type two way solenoid valve 110 is disposed downstream the normally closed type two way solenoid valve 109 and is combined therewith each other. Further, the solenoid coils (not shown) of the normally closed type and normally open type two way solenoid valves 109 and 110 are electrically connected to the output side of the microcomputer 13.

Further, in this air pressure control valve 28, the normally closed type two way solenoid valve 109 is used for supplying the operating compressed air from the air tank 29 to the clutch control air cylinder 27. On the other hand, the normally open type two way solenoid valve 110 is used for discharging the operating compressed air from the clutch control air cylinder 27 to the air.

The vehicle speed sensor 31 is disposed at the diesel engine (not shown) mounted on the bus.

The steering effort sensor 32 is for detecting the force applied to the steering wheel 23, and is incorporated in the steering wheel.

Figure 15:
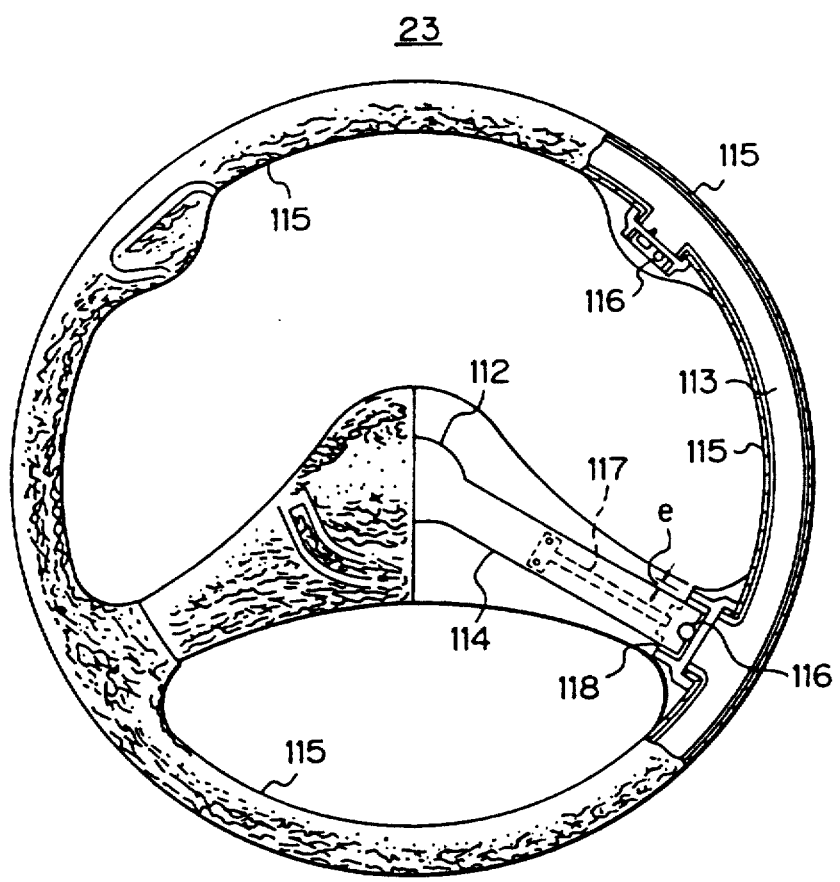
FIG. 15 is a plan view partially cross-sectioned steering wheel.

Further, as shown in FIG. 15, the steering wheel 23 includes hub 112, a rim core 113 integrated with the hub 112 via spoke 114, a rim sheath 115 covering the rim core 113 via a roller 116 so as to permit a slight free slidable rotation in the steering direction and is assembled therewith. The steering effort sensor 32 includes a bending beam 117, of the root portion is secured at the side of the rim core 113 and the top portion is fitted into a groove 118 at the side of the rim sheath 115 so as to represent the sliding amount by bending, and an electromagnetic inductor type sensor (not shown) for detecting the bending of the bending beam 117, and the electromagnetic inductor type sensor is electrically connected to the input side of the microcomputer 13.

The wheel rotation sensors 33, 34, 35, 36 are respectively disposed corresponding to the front wheels and the rear wheels, and are electrically connected to the microcomputer 13.

The pressure sensor 37 is combined with the air pressure control valve 28 at the position where the air pressure of the clutch control air cylinder 27 can be sensed, and is electrically connected to the microcomputer 13.

Since the power steering and limited slip differential system 10 has been assembled as explained above, next, a computer program which simulates the system 10 was prepared for determining an optimum control, and the simulation result was compared and verified with actual vehicle data. Thereafter, control methods were investigated for reducing the phase lag without increasing the gain.

Figure 5:
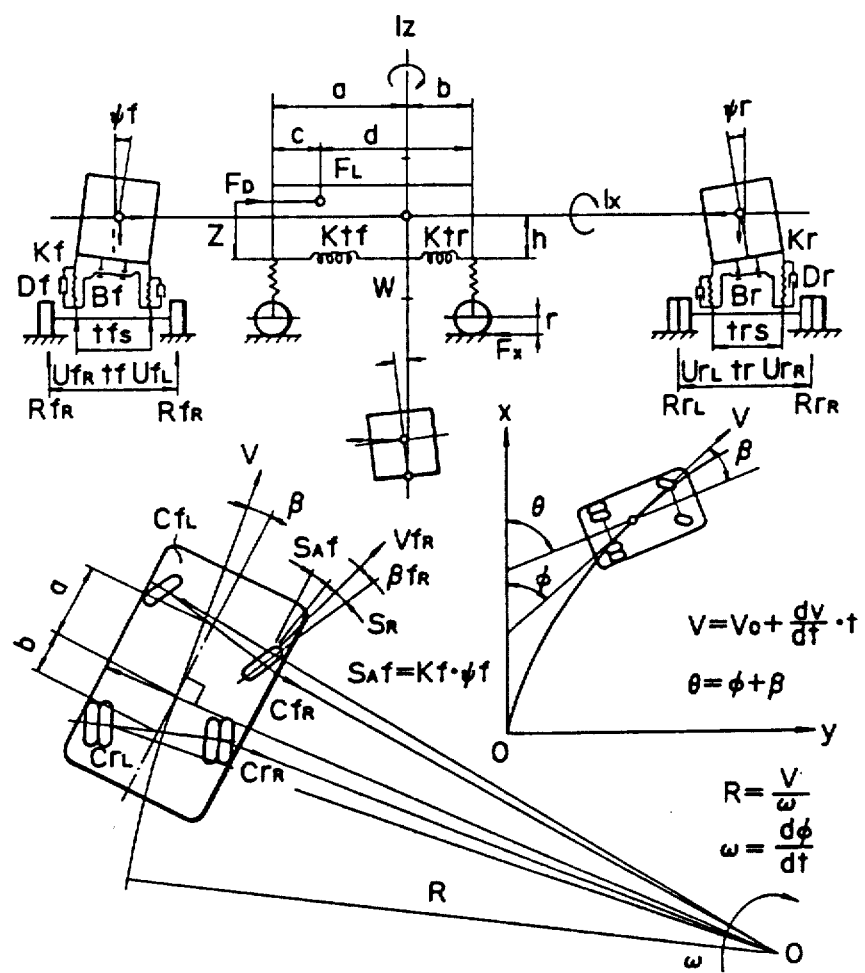
FIG. 5 is a view illustrating a vehicle model.
Figure 6:
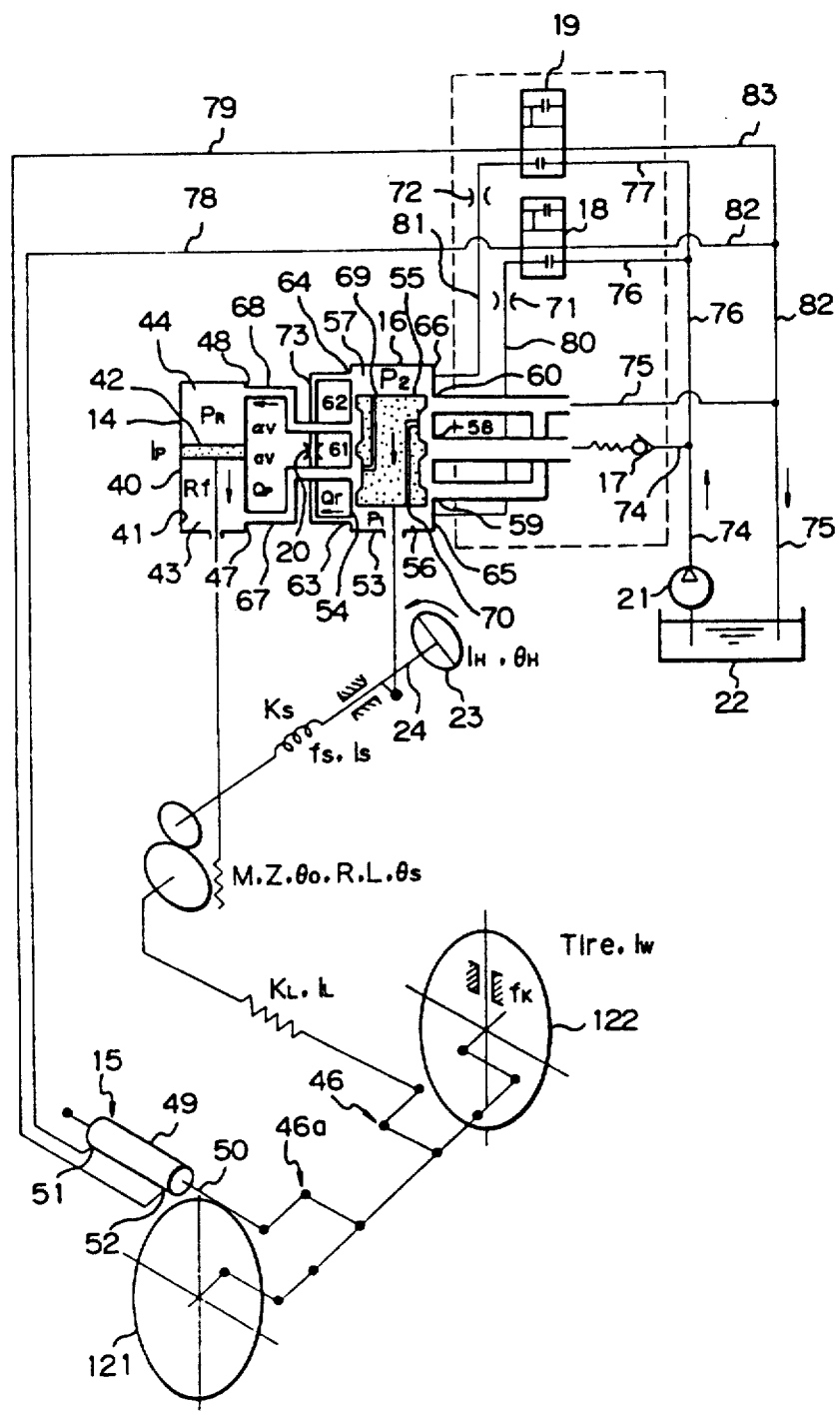
FIG. 6 is a schematic diagram of the steering system of the power steering and limited slip differential system according to the present invention.

For this simulation the vehicle model as shown in FIG. 5 and the steering system model as shown in FIG. 6 were used.

Further, equations of motion and hydraulic pressure calculation were formulated, and such were solved by using CSSL (Continuous System Simulation Language). The results of the calculation showed nearly the same tendency as the actually measured data so that the investigation on the optimum control was carried out using the results.

This investigation on the optimum control will be explained hereinbelow.

First, control of the steering system is explained. As will be understood from FIG. 7, generation of hydraulic pressure in the power steering arrangement creates delays of 0.1 to 0.2 sec. after the application of the steering effort to the steering wheel. When the hydraulic pressure is immediately generated after sensing steering signals, shortening of the delay at least by 0.1 sec. is enabled. This shortening by 0.1 sec. is, as will be understood from FIG. 7, equivalent to the fact that the delay level of the bus is improved to that of the truck. In other words, the delay level at a vehicle speed of 100 Km/h is equivalent to that below a vehicle speed of 60 Km/h. With such in mind, several control methods were investigated through calculation by using the model shown in FIG. 6. As the result it was found that such control is the optimum in which, when the force applied to the rim of the steering wheel is detected, the pressure oil is supplied to the power cylinder in advance of the steering operation via the mechanical system, to begin the actual steering of the front wheels. Simultaneously the pressure oil is also supplied to the pressure oil reaction chambers of the directional control valve to generate the steering reaction (see FIG. 8).

Figure 9:
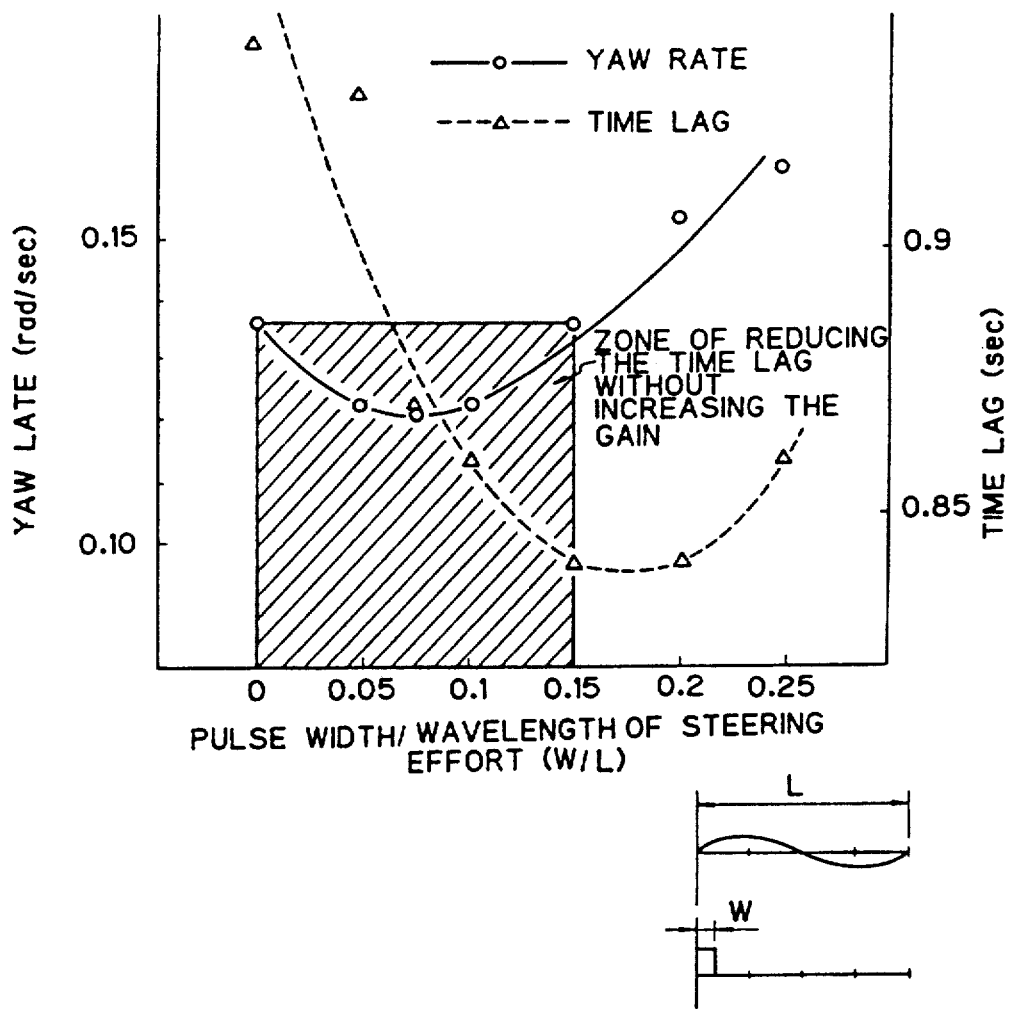
FIG. 9 is a graph explaining study with regard to pressure oil injection width by simulation.

It is important that the pressure oil, namely the compensating pressure oil, be supplied to the power cylinder, not only at the beginning of the steering but also at the time of steering back, in the form of pulse like pressure oil. If it were supplied at the beginning of steering only, the gain would deteriorate, namely increase (see FIG. 9).

Further, it was found that there is an optimum width of the pulse like pressure oil. In a case where the pressure of the pulse is 0.5 MPa, 0.075 wavelength pulse is effective for the pulse width at the beginning of steering and 0.25 wavelength pulse for that at the time of steering back (see FIG. 10). Further, the reason for the concurrent supply of the pressure oil to the pressure oil reaction chambers is to prevent the steering response from disappearing due to steering pull caused by the pressure oil supplied to the power cylinder.

Still further, it is preferable to determine the pulse width and the pulse pressure of the pulse like pressure oil in response to both variations of the steering effort applied to the steering wheel and the differential value thereof. The indifference of the steering operation is eliminated by applying the pulse like pressure oil correspondingly to the reaction chambers of the directional control valve.

Figure 11:
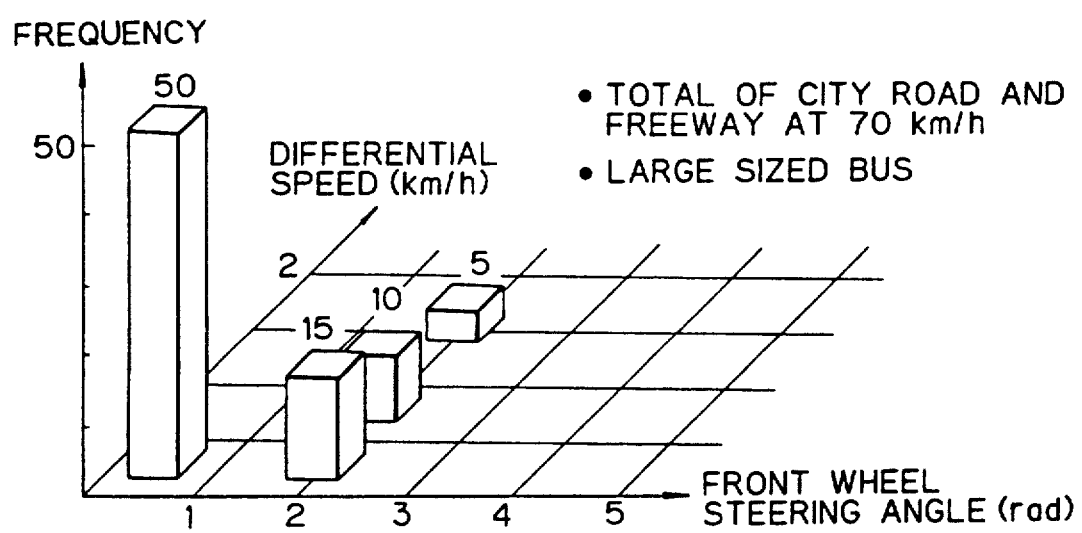
FIG. 11 is a graph illustrating actuating circumstances of the differential system under actual road conditions.
Figure 12:
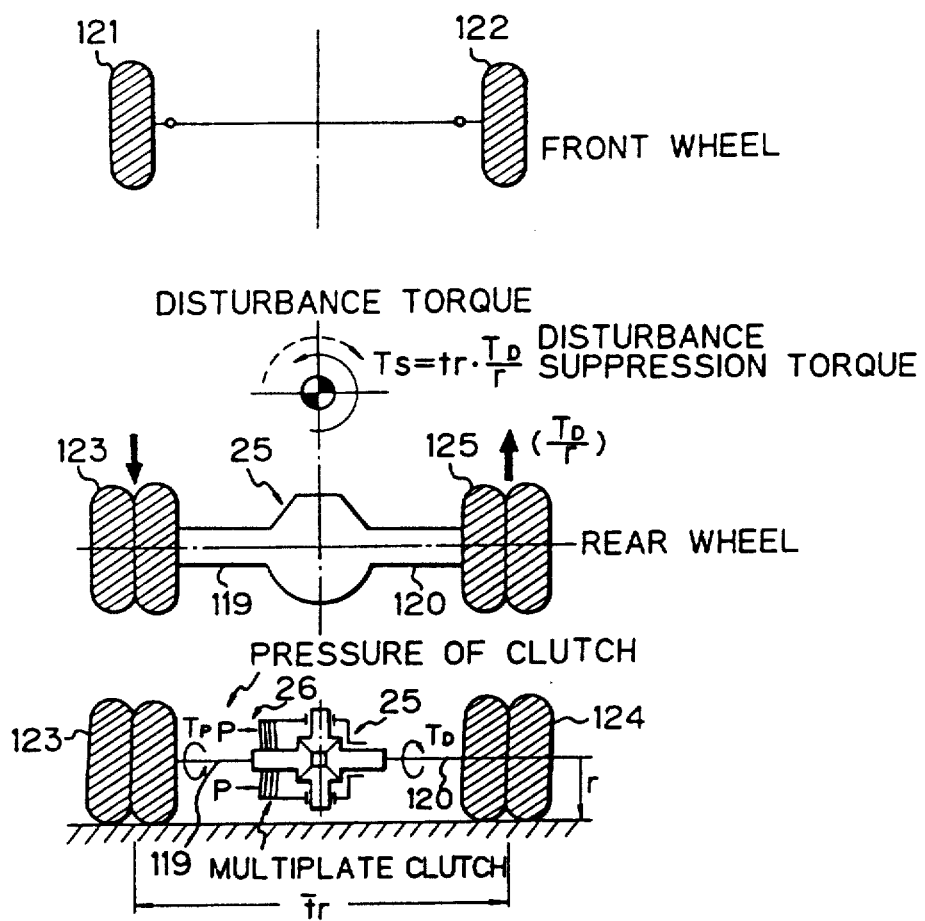
FIG. 12 is a diagram illustrating disturbance suppression effect by the limited slip differential torque.

On the other hand, with regard to the control in the differential system, when a vehicle is running straight on a flat road, theoretically, no differential operation is needed. However, actually the differential operation still activates (see FIG. 11). When torque Td resisting the differential operation is applied, torque Ts (see FIG. 12), which is obtained by multiplying the quantity of the torque Td divided by the tire radius by the rear axle tread, functions to suppress disturbances which interfere with the running of the vehicle along the course.

Accordingly, the vehicle speed is detected from the front wheel revolution speed, the steering angle is detected from the revolution speed difference between the right and left front wheels and the slip rate of the rear wheels is detected from the revolution speed difference between the front and rear wheels. Based upon the detected values, the torque Td is controlled so as to increase with vehicle speed in a small steering angle region for enhancing stable straight running, and to be zero so as to maintain the lateral force gripping of the tires in the spin limit, and is further controlled so as to increase when one side of the rear wheels happens to slip, and to decrease when both sides of the rear wheels happen to slip, in order to improve prompt start performance on the road having a small road surface friction coefficient $\mu$ and to reduce side slip.

Figure 13:
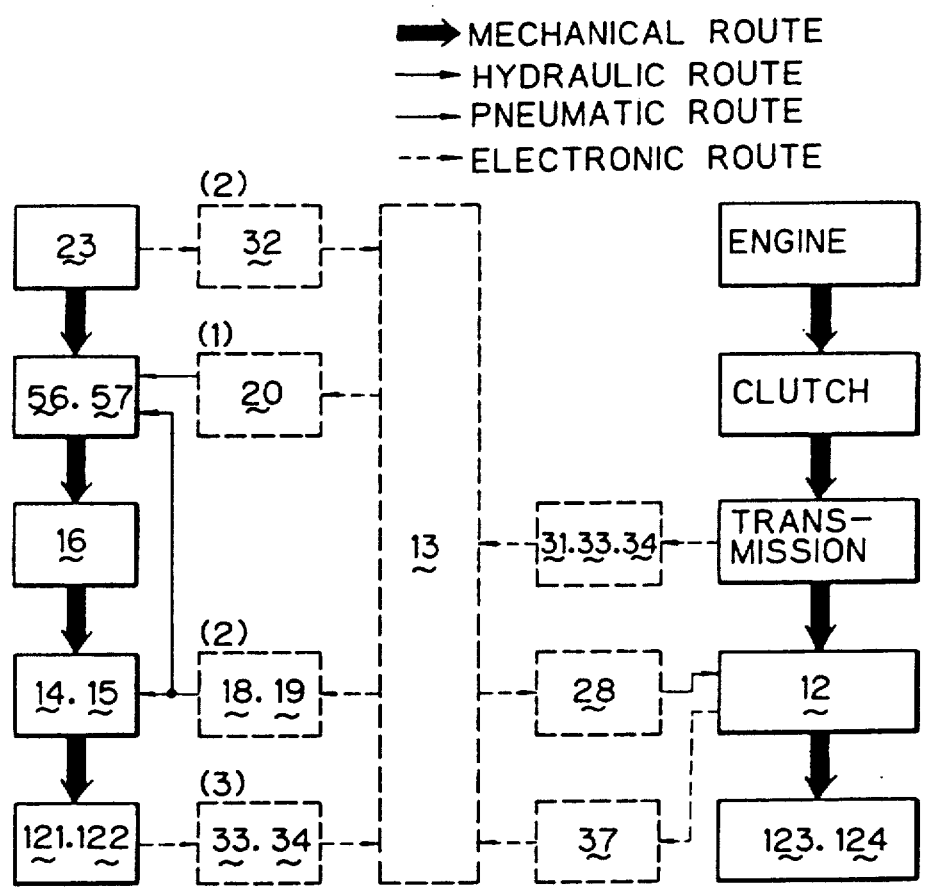
FIG. 13 is a diagram illustrating the control system.

Based upon the investigation results on the optimum control thus obtained, the control of the steering system for enhancing the steering response performance and the control of the differential system for enhancing the disturbance response performance are integrated to realize this system 10 (see FIG. 13).

Figure 14:
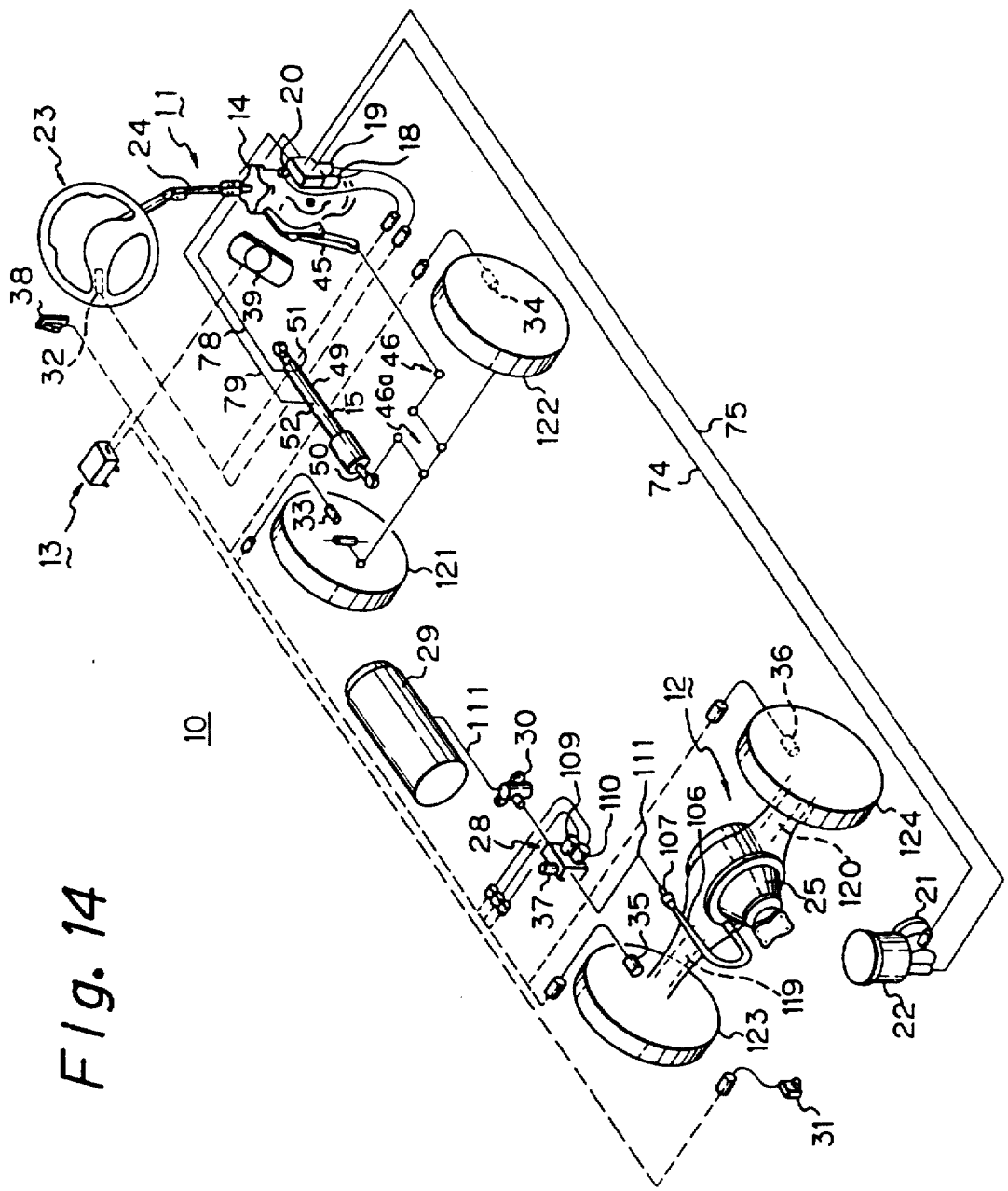
FIG. 14 is a schematic overview of the power steering and limited slip differential system according to the present invention.

The structure of the steering system is shown in FIG. 14. The upstream pressure is always kept higher by 5 Kg/cm$^2$ (pressurized oil) than that in the circuit with the pressure oil setting valve 17.

The steering effort applied to the rim sheath 115 of the steering wheel 23 is calculated by the microcomputer 13 based on the bending and the spring constant of the bending beam 117. When the steering effort is applied on the steering wheel, the electromagnetic inductor type sensor built into the steering wheel 23 detects the effort, the injection pressure control valves 18, 19 are selectively opened by the current selectively provided from the microcomputer 13, the compensating pressure oil is selectively injected into the pair of cylinder chambers of the auxiliary booster 15 and the actual steering of the front wheels 121, 122 begins while bypassing the system.

Almost simultaneously, the compensating pressure oil is also injected into the reaction chambers 56, 57 of the directional control valve 16. Through the supply of this compensating pressure oil to the auxiliary booster 15, the steering indifference caused by the pull from the steering wheel 23 is prevented.

Figure 16:
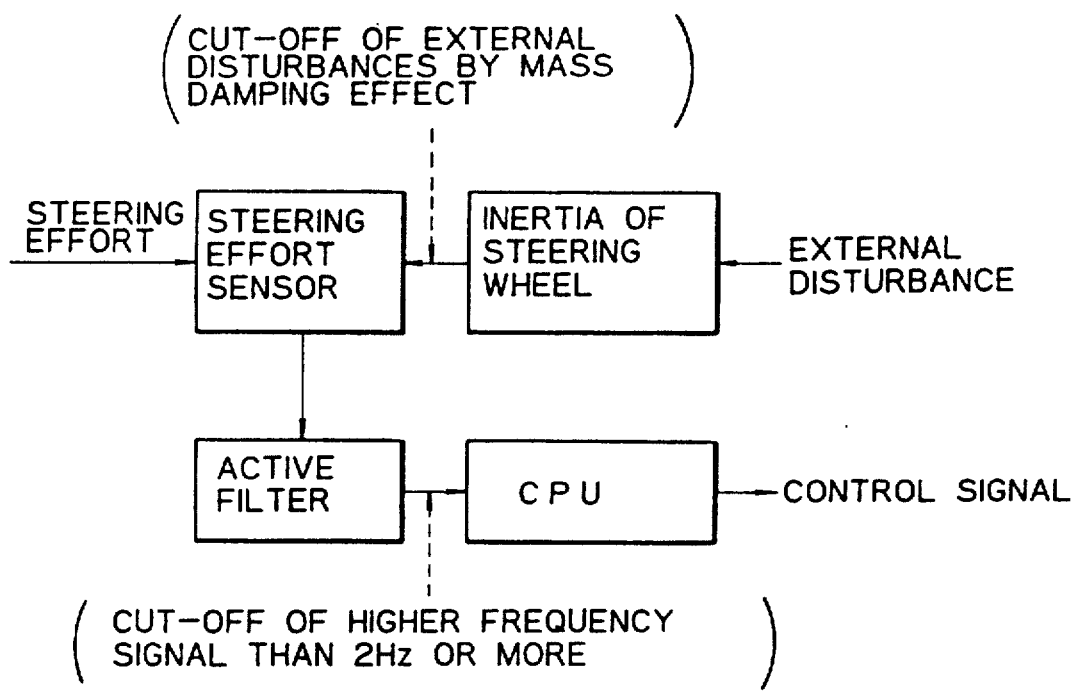
FIG. 16 is a diagram for explaining the mass-damper effect and the active low pass filter.

The steering effort sensor 32, being located at a closer position to the driver than the rim core 113 which is the inertia mass of the steering wheel 23, detects the true steering effort without being affected by the inertia and is adapted to respond only to the steering effort by the driver through constitution unlikely to be affected by high frequency disturbances such as kick-back by means of the mass-damper effect of the rim core 113 and high response active low pass filter provided in the side of the microcomputer 13 (see FIG. 16).

Figure 17:
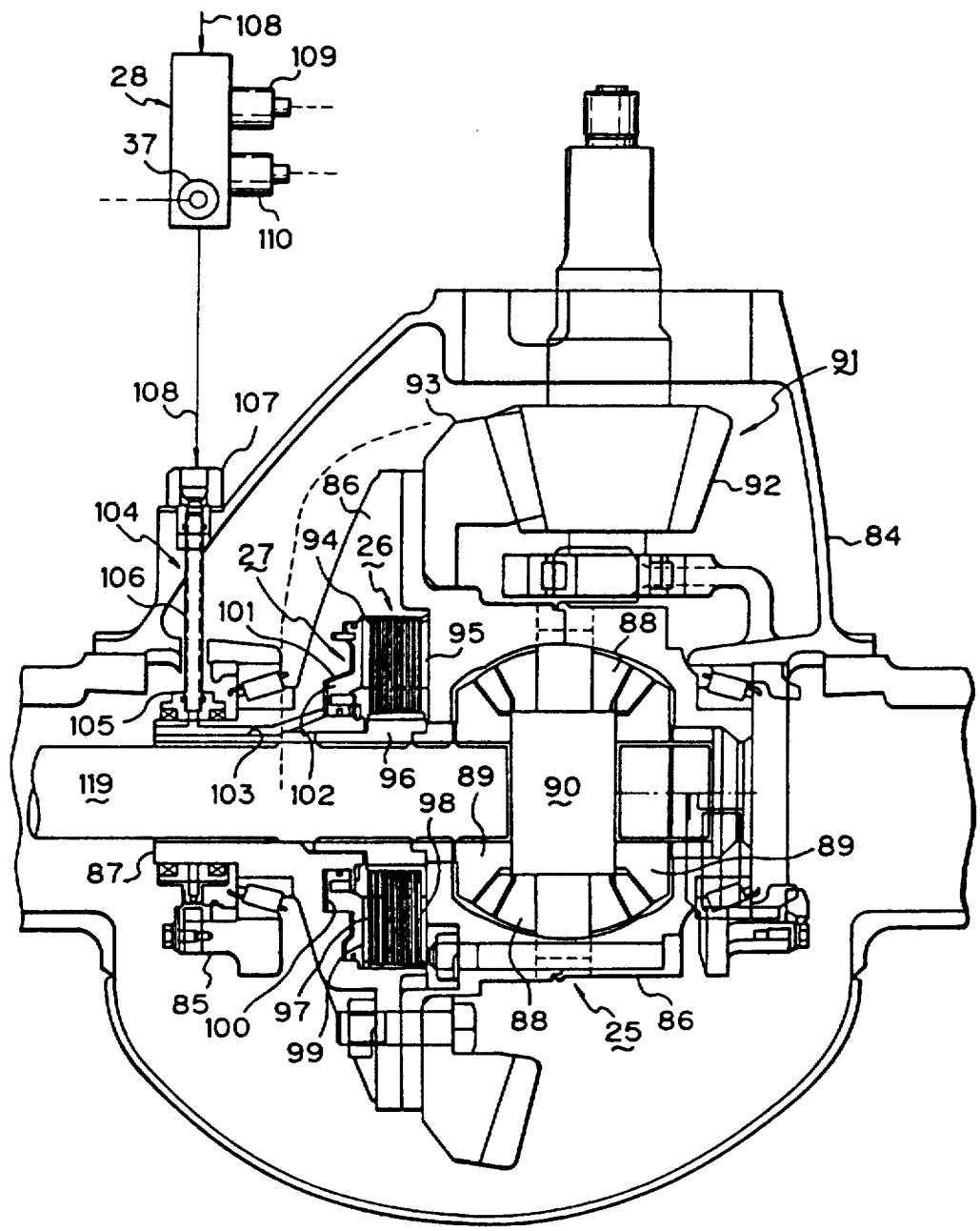
FIG. 17 is a cross sectional view illustrating the differential system of the power steering and limited slip differential system according to the present invention.

On the other hand, the structure of the differential system is shown in FIG. 17. In this differential system, the friction clutch 26 is incorporated in the differential case 86, and the clutch control air cylinder 27 is also disposed in the differential case 86 in association with the friction clutch 26. With the operating compressed air supplied to the clutch control air cylinder 27, the ring piston 102 is pressed to the many external gear and internal gear clutch plates 97, 98 of the friction clutch 26 via the pressure ring 99 to generate the torque which limits the differential operation in the differential system.

Next, the operation of the power steering and limited slip differential system 10 designed as described above is explained.

In this power steering and limited slip differential system 10, the steering responsive control, the disturbance responsive control and the speed sensitive control are carried out at the same time in association with each other.

In the steering responsive control, when a steering effort is applied to the steering wheel 23, the steering effort sensor 32 detects the steering effort and provides the steering effort in the form of an electrical signal to the microcomputer 13 and simultaneously the vehicle speed is provided in the form of an electrical signal from the vehicle speed sensor 31 to the microcomputer 13. Accordingly, the microcomputer 13 controls the current flowing through the solenoid coils of the injection pressure control valves 18, 19 to selectively open and close the injection pressure control valves 18, 19 in response to the signals input from the steering effort sensor 32 and the vehicle speed sensor 31.

Since the injection pressure control valves 18, 19 are selectively opened and closed, before the operating pressure oil is selectively supplied to the cylinder chambers 43, 44 of the main booster 14 by valve changing over of the directional control valve 16 via the mechanical system, the compensating pressure oil is selectively supplied to the pair of cylinder chambers of the auxiliary booster 15 from the upstream side of the pressure oil setting valve 17 in the front wheels. At the same time, the compensating pressure oil is selectively injected into the reaction chambers 56, 57 of the directional control valve 16 to generate the steering response, thereby controlling the increase of the yaw rate and the phase lag without increasing the gain during steering operation. Of course, in this steering response control, when the steering wheel 23 is steered, the compensating pressure oil is supplied in the steering direction into the pair of cylinder chambers of the auxiliary booster 15 and the pair of reaction chambers of the directional control valve 16 in the form of pulse like pressure oil for a period of 0.075 wavelength from the beginning of the steering. When the steering wheel 23 is steered back, the compensating pressure oil is supplied in the steering back direction into the pair of cylinder chambers of the auxiliary booster 15 and the pair of reaction chambers of the directional control valve 16 in the form of pulse like pressure oil for a period of 0.25 wavelength from the beginning of the steering back.

On the other hand, the disturbance responsive control is carried out based upon the vehicle speed, steering angle and rear wheel slip rate determined by the microcomputer 13. For that purpose, the wheel revolution sensors 33, 34, 35, 36 detect the revolution speed of the front wheels 121, 122 and the rear wheel 123, 124 and provide the revolution speed to the microcomputer in the form of electrical signals. Then the microcomputer 13 calculates and determines the vehicle speed from the revolution speed of the front wheels, determines and calculates the steering angle from the revolution speed difference between the right and left front wheels, and the slip rate of the rear wheels 123, 124 from the revolution speed difference between the front wheels 121, 122 and the rear wheels 123, 124.

Now, assuming that the bus is running in a low speed region, the normal close type and normal open type two way solenoid valves 109, 110 in the air pressure control valve 28 are open and close controlled by the microcomputer 13 in response to the increase of the vehicle speed, increase of the front wheel steering angle and the air pressure of the clutch control air cylinder 27. The operating compressed air is supplied from the air tank 29 to the clutch control air cylinder 27 and is discharged from the clutch control air cylinder 27 to the air to reduce the air pressure in the clutch control air cylinder, to lower the force of the clutch control air cylinder 27 pressing the friction clutch 26 and to decrease the friction torque generated in the friction clutch 26 for limiting the differential movement of the differential gear mechanism 25.

Accordingly, the differential movement limiting torque in the differential gear mechanism 25 is controlled to facilitate a smooth lane change by buses.

Further, assuming that the bus is running in a high speed region, the air pressure control valve 28 is open and close controlled by the microcomputer 13 as described above in response to the increase of the vehicle speed, increase of the front wheel steering angle and the air pressure of the clutch control air cylinder 27. This acts to raise the air pressure in the clutch control air cylinder 27, to increase the force of the clutch control air cylinder pressing the friction clutch 26 and to increase the friction torque generated in the friction clutch 26 for limiting the differential movement of the differential gear mechanism 25.

Accordingly, the differential movement limiting torque in the differential gear mechanism 25 is controlled to stabilize the straight running of the bus and to maintain the lateral force gripping of the tires.

Further, when the one side of the rear wheels 123, 124 of the bus slips on a road having a low road surface friction coefficient μ, the air pressure control valve 28 is open and close controlled by the microcomputer 13 to raise the air pressure in the clutch control air cylinder 27, to increase the force of the clutch control air cylinder 27 pressing the friction clutch 26 and to increase the torque generated in the friction clutch 26 for limiting the differential movement of the differential gear mechanism 25.

Thereafter, when the one side slip of the rear wheels 123, 124 changes to both sides slipping, i.e., both rear wheels slip, the air pressure control valve 28 is open and close controlled by the microcomputer 13 to lower the air pressure in the clutch control air cylinder 27, to reduce the force of the clutch control air cylinder 27 pressing the friction clutch 26 and to decrease the torque generated in the friction clutch 26 for limiting the differential movement of the differential gear mechanism 25.

Accordingly, the bus performs a smooth start and runs on a road having a low road surface friction coefficient μ.

Further, in the speed sensitive control, the microcomputer 13 controls the current flowing through the electric actuator of the reaction adjustment valve 20 in response to the signals from the vehicle speed sensor 31, and adjusts the orifice of the reaction adjustment valve 20 in response to the increase of the vehicle speed to change the resistance to the pressure oil flowing between the reaction chambers 56, 57 of the directional control valve 16 and to thereby make the required steering effort lighter during a stationary steering and a low speed running and somewhat heavier during a high speed running so as to obtain a sufficient handling response feeling.

Figure 18:
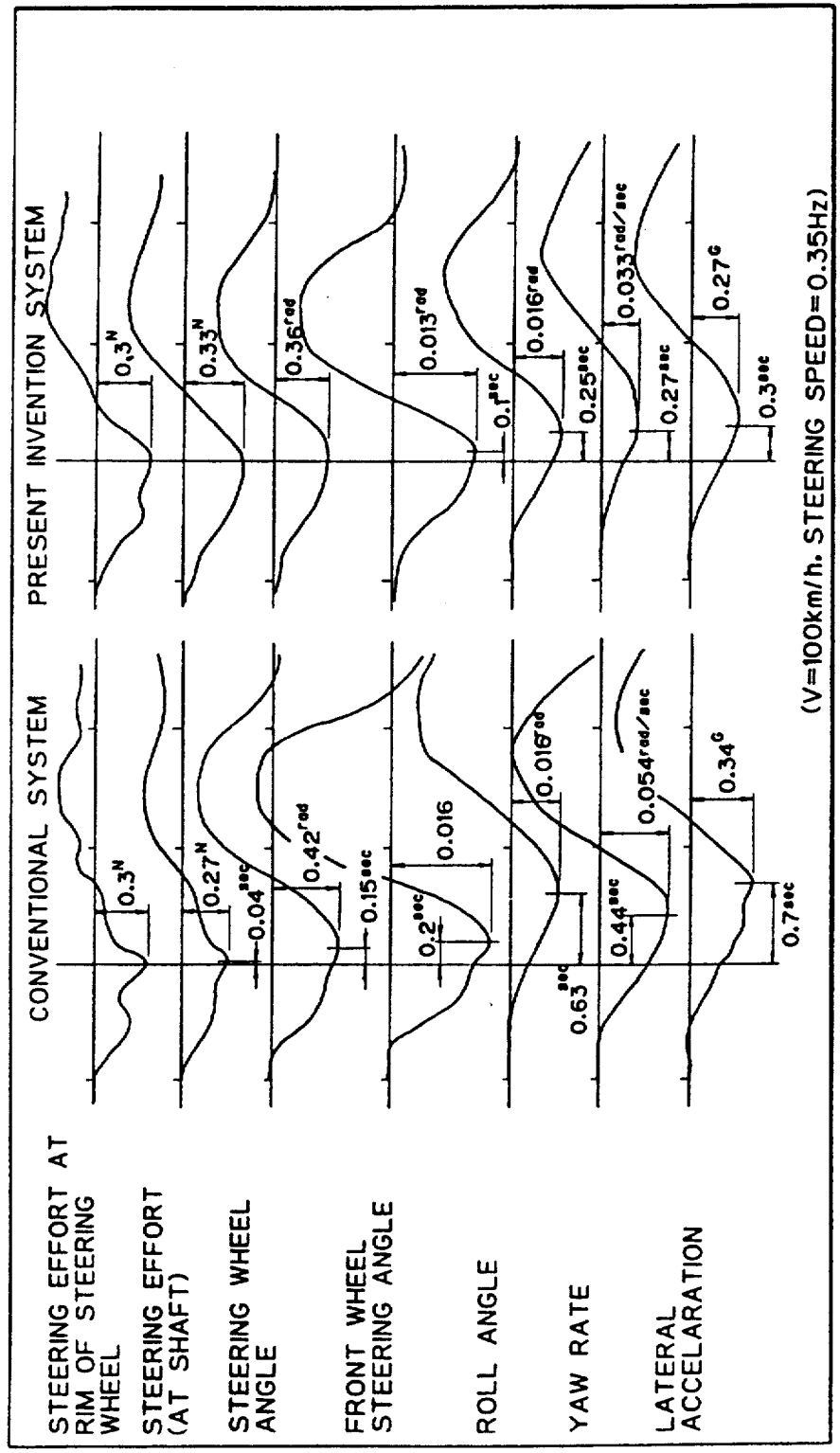
FIG. 18 is a compendium of graphs illustrating data with regard to lane change.

The results of these controls performed as described above are shown in FIG. 18 through FIG. 20.

Figure 19:
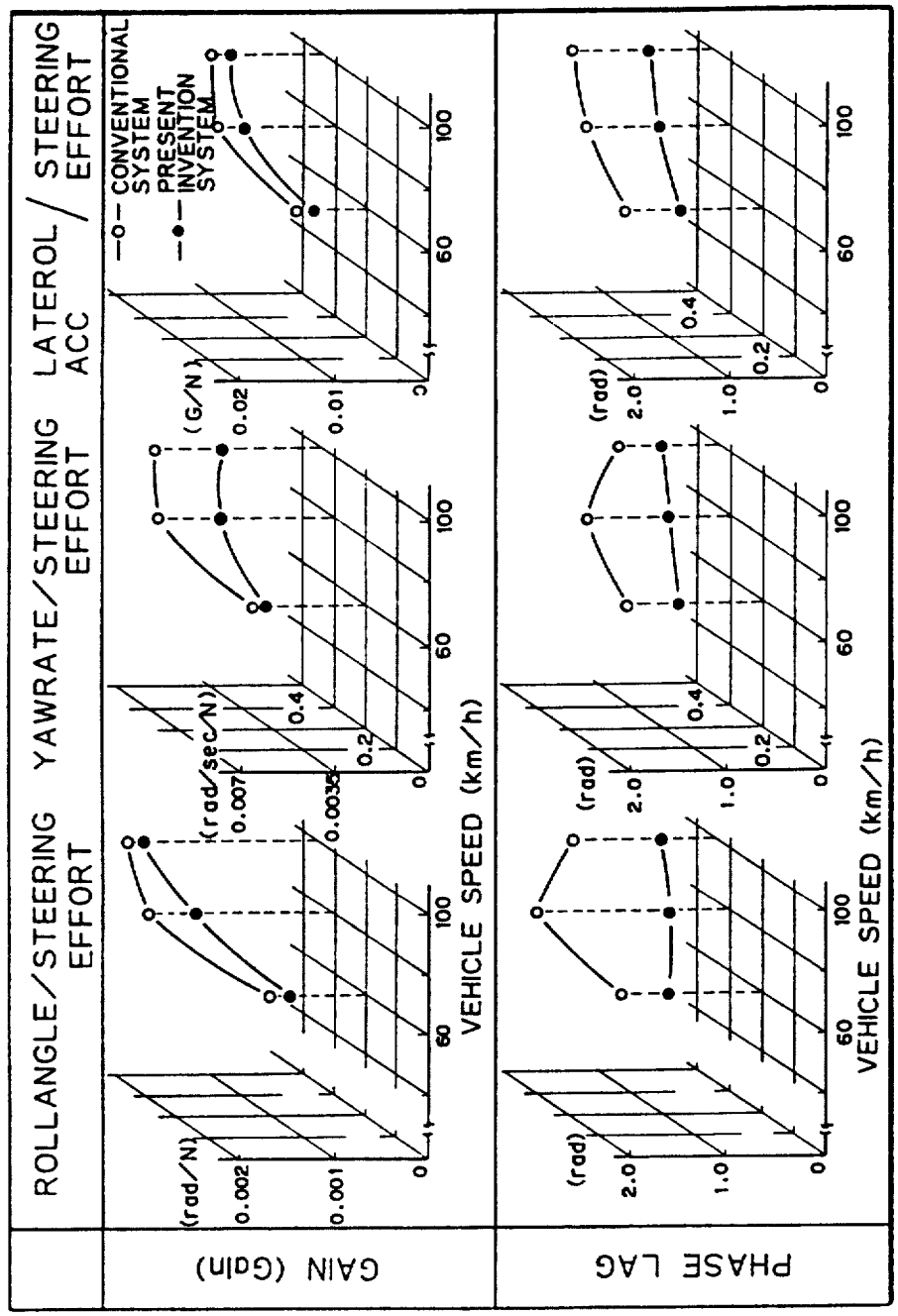
FIG. 19 is a compendium of graphs illustrating effects on gain and phase lag.

In FIG. 19, the gain and phase lag are illustrated in relation to the vehicle speed and the lateral acceleration.

The data of this system 10 at a vehicle speed of 100 Km/h is improved equivalent to those of the conventional system below a speed of 60 Km/h.

Figure 20:
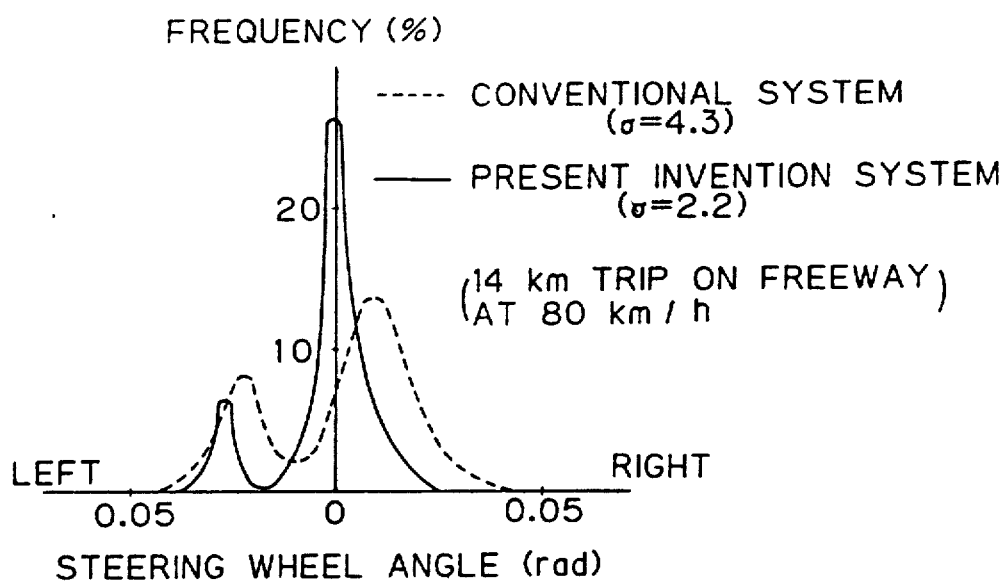
FIG. 20 is a graph illustrating steering correction frequency.

FIG. 20 shows steering angles and their frequency on a highway.

The steering angle frequency distribution of this system 10 is reduced above 50% in terms of standard deviation in comparison with that of the conventional system.

As will be understood from the above since, the power steering and limited slip differential system according to the present invention comprises a main booster which generates a steering effort for front wheels; an auxiliary booster which generates a compensation steering effort for the front wheels; a directional control valve which has pair of reaction chambers and which controls the direction of operating pressure oil which is supplied from a hydraulic pump to the main booster and concurrently discharged from the main booster to an oil reservoir; a pressure oil setting valve which sets the pressure of the operating pressure oil supplied to the main booster, and the pressure of compensating pressure oil supplied to the auxiliary booster and the reaction chambers of the directional control valve; an injection pressure control valve which injects the compensating pressure oil into the reaction chambers of the directional control valve and the auxiliary booster in response to a vehicle speed and the steering effort at the beginning of steering and steering back during the handling, and concurrently controls the pressure of the injected compensating pressure oil; a friction clutch disposed between the differential case of a differential gear mechanism and a driving wheel axle for rear wheels; a clutch control air cylinder for coupling and decoupling the friction clutch; and an air pressure control valve which charges and discharges operating compressed air to and from the clutch control air cylinder in response to the vehicle speed and the steering angle of the front wheels, and further in response to the slipping of one side and the both sides of the rear wheels, and controls the air pressure of the clutch control air cylinder. In the power steering and limited slip differential system according to the present invention, the phase lag is reduced while suppressing the increase of the gain, the intrusion of disturbances is suppressed, according thereto, the phase lag and gain are decreased, and the start and run of the vehicle on the road having a low road surface friction coefficient μ and on the unleveled land are smoothed. Further the generation of yaw, roll, lateral acceleration and the steering wheel weave in a high speed region is reduced to the level which was encountered with the conventional vehicle driving at 40 Km/h lower speed, thereby the steering response performance and the disturbance responsive performance are enhanced to also enhance the control stability of the vehicle, accordingly. The present invention is applicable to several kinds of vehicles, and, in particular, is very useful and practical for large commercial vehicles.

From the above embodiment of the present invention described with reference to the drawings, persons having ordinary skill in the technical field pertaining the present invention can easily replace the present invention for several modifications in which the contents of the present invention are indispensable for achieving the tasks of the present invention and completing the invention and which is the nature of the present invention, is originated from the technical essence of the present invention and is objectively recognized such is inherent.

What is claimed is:

1. A power steering and limited slip differential system comprising:
    a main booster which generates a steering effort for front wheels;
    an auxiliary booster which generates a compensation steering effort for the front wheels;
    a directional control valve which has a pair of reaction chambers and which controls the direction of operating pressure oil which is supplied from a hydraulic pump to the main booster and concurrently discharged from the main booster to an oil reservoir;
    a pressure oil setting valve which sets the pressure of the operating pressure oil supplied to the main booster, and the pressure of compensating pressure oil supplied to the auxiliary booster and the reaction chambers of the directional control valve;
    injection pressure control valves which inject the compensating pressure oil into the reaction chambers of the directional control valve and the auxiliary booster in response to a vehicle speed and a manual steering force applied at the beginning of steering into a turn and the beginning of steering out of a turn, and concurrently controls the pressure of the injected compensation pressure oil;

a friction clutch disposed between a differential case of a differential gear mechanism and a driving wheel axle for rear wheels;

a clutch control air cylinder for coupling and decoupling the friction clutch; and an air pressure control valve which charges and discharges operating compressed air to and from the clutch control air cylinder in response to the vehicle speed and the steering angle of the front wheels, and further in response to the slipping of at least one of the rear wheels, and controls the air pressure of the clutch control air cylinder.

2. A power steering and limited slip differential system according to claim 1, wherein said auxiliary booster is link-coupled to at least one of a knuckle and a tie rod of the front wheels through a link mechanism.

3. A power steering and limited slip differential system according to claim 1, wherein said auxiliary booster is constituted in a form of a double action cylinder having a pair of cylinder chambers and is link-coupled to a knuckle side of the front wheels via a link mechanism.

4. A power steering and limited slip differential system according to claim 1, wherein said directional control valve includes a bypass line which communicates the pair of reaction chambers to each other and a reaction adjustment valve disposed in the bypass line.

5. A power steering and limited slip differential system according to claim 4, wherein said reaction adjustment valve is orifice-adjusted in such a manner that the steering effort is relatively lighter during a stationary steering and a low speed running and somewhat heavier during a high speed running.

6. A power steering and limited slip differential system according to claim 1, wherein said pressure oil setting valve is disposed at an upstream side of the directional control valve in a supply side pressure oil piping which connects the main booster to the hydraulic pump via the directional control valve in order that the pressure of the compensating pressure oil led to a pair of cylinder chambers of the auxiliary booster and the pair of reaction chambers of the directional control valve is always set higher than that in the circuit of the main booster.

7. A power steering and limited slip differential system according to claim 1, wherein said pressure oil setting valve always sets the pressure of the compensating pressure oil higher by 5 Kg/cm² than that in a circuit of the main booster.

8. A power steering and limited slip differential system according to claim 1, wherein said injection pressure control valves are disposed between the hydraulic pump located upstream of the pressure oil setting valve and the oil reservoir located downstream of the main booster in compensating pressure oil pipings which correspondingly connect a pair of cylinder chambers of the auxiliary booster and the pair of reaction chambers of the directional control valve.

9. A power steering and limited slip differential system according to claim 1, wherein said injection pressure control valves are a pair of linear solenoid valves, and the pair of linear solenoid valves are correspondingly connected at the hydraulic pump located upstream of the pressure oil setting valve with auxiliary pressure oil pipings which connect a pair of cylinder chambers of the auxiliary booster with the pair of reaction chambers of the directional control valve and at the oil reservoir located downstream of the main booster with the auxiliary pressure oil pipings which connect the pair of cylinder chambers of the auxiliary booster with the pair of reaction chambers of the directional control valve.

10. A power steering and limited slip differential system according to claim 1, wherein said injection pressure control valves are operated by supplying the compensating pressure oil in a form of a pulse of pressure oil at the beginning of steering and of steering back.

11. A power steering and limited slip differential system according to claim 1, wherein said injection pressure control valves are operated by supplying the compensating pressure oil in a form of a pulse of pressure oil having a pulse width ranging from 0.1 through 0.25 wavelength with respect to a manual steering force wavelength at the beginning of steering into a turn and of steering out of a turn.

12. A power steering and limited slip differential system according to claim 1, wherein said injection pressure control valves are supplied with the compensating pressure oil in a form of a pulse of pressure oil at the beginning of steering into a turn and of steering out of a turn and a pulse width and a pulse amplitude of the pulse of pressure oil are determined in response to both variations of the manual steering force applied to a steering wheel and the rate of change thereof.

13. A power steering and limited slip differential system according to claim 1, wherein said clutch control air cylinder includes a ring cylinder which opens to a ring chamber and is formed in the differential case, and a ring piston which is fitted in the ring cylinder so as to permit slidable reciprocating movement while facing to the pressure ring of the friction clutch in order to form a cylinder chamber in the ring cylinder.

14. A power steering and limited slip differential system according to claim 13, wherein said clutch control air cylinder further includes a pressure air coupling which connects the cylinder chamber to a pressure air source via a pressure air piping.

15. A power steering and limited slip differential system according to claim 14, wherein said pressure air coupling includes a sealed slip ring fitted to a boss of the differential case so as to permit relative rotational movement thereto which is stopped by a ring gear boss in a differential carrier supporting the differential case, and an air lead pipe connecting the sealed slip ring to the pressure air line.

16. A power steering and limited slip differential system according to claim 1, wherein said air pressure control valve includes a normally closed two way solenoid valve disposed in a pressure air piping which connects the clutch control air cylinder to a pressure air source, and a normally opened two way solenoid valve disposed in the pressure air piping downstream the normally closed two way solenoid valve, and the normally closed two way solenoid valve supplies operating compressed air from the pressure air source to the clutch control air cylinder when the normally opened two way solenoid valve is closed and the normally opened two way solenoid valve discharges the operating compressed air to the air from the clutch control air cylinder when the normally closed two way solenoid valve is closed.

17. A power steering and limited slip differential system according to claim 1, wherein said air pressure control valve includes a normally closed two way solenoid valve and a normally opened two way solenoid valve integrally assembled with the normally closed two way solenoid valve downstream thereof, and the normally closed two way solenoid valve supplies operating compressed air to the clutch control air cylinder and the normally opened two way solenoid valve discharges the operating compressed air from the clutch control air cylinder.

18. A power steering and limited slip differential system according to claim 1, further comprising;

a steering wheel which includes a rim core integrated with a hub via spokes and a rim sheath covering the rim core via a roller so as to permit a slight free slidable rotation in a steering direction; and a manual steering pressure sensor which includes a bending beam of which a root portion is secured at the side of the rim core and a top portion is fitted into a groove at the side of the rim sheath so as to represent by bending the sliding amount between the rim core and the rim sheath and an electromagnetic inductor sensor detecting the bending of the bending beam.

* * * * *

UNITED STATES PATENT AND TRADEMARK OFFICE
CERTIFICATE OF CORRECTION

PATENT NO. : 5,301,766
DATED : April 12, 1994
INVENTOR(S) : Fujio MOMIYAMA et al.

It is certified that error appears in the above-indentified patent and that said Letters Patent is hereby corrected as shown below:

Col. 3, line 31, delete "which"; and
line 33, delete "which".

Figure 7:
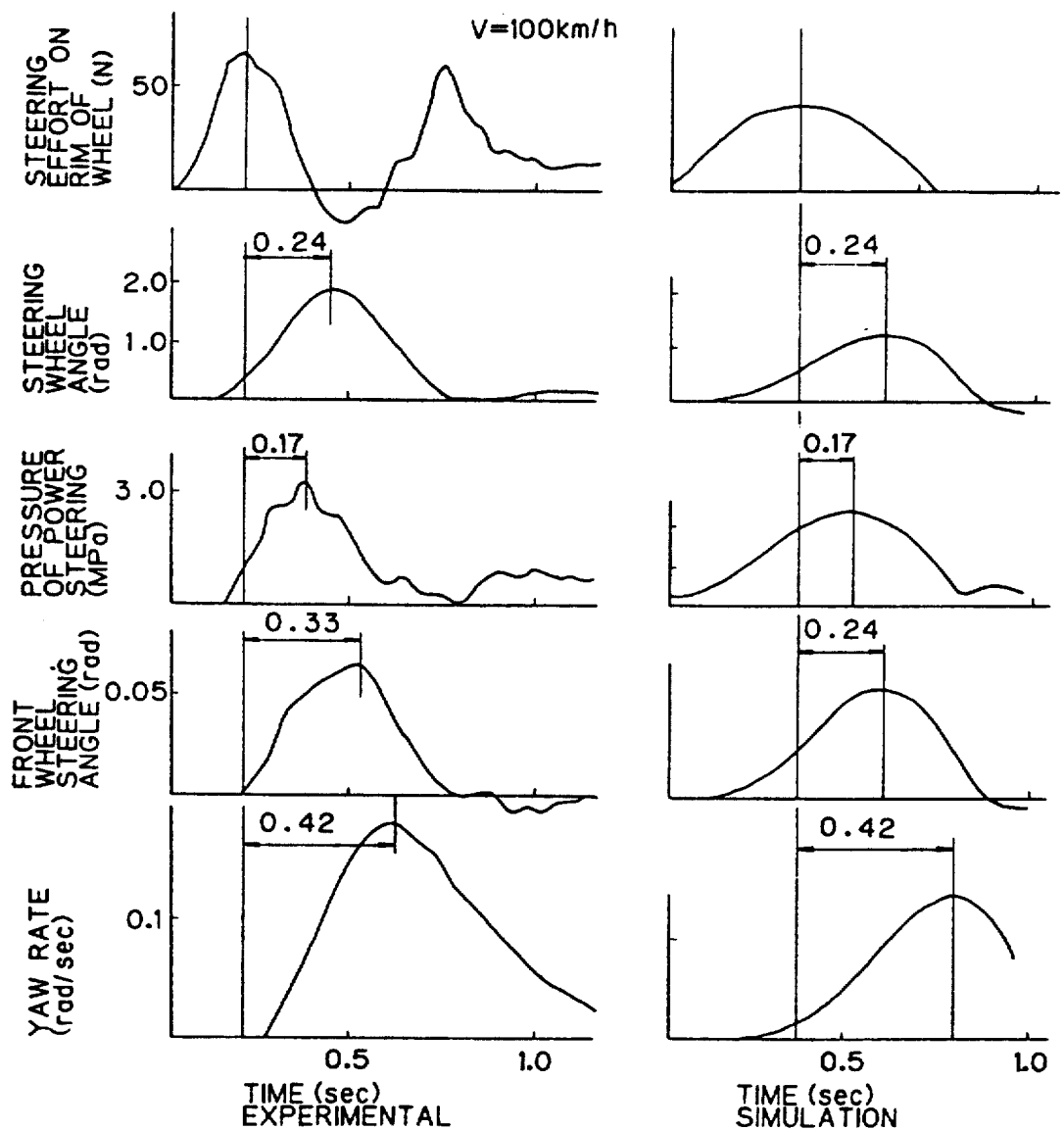
Figure 8:
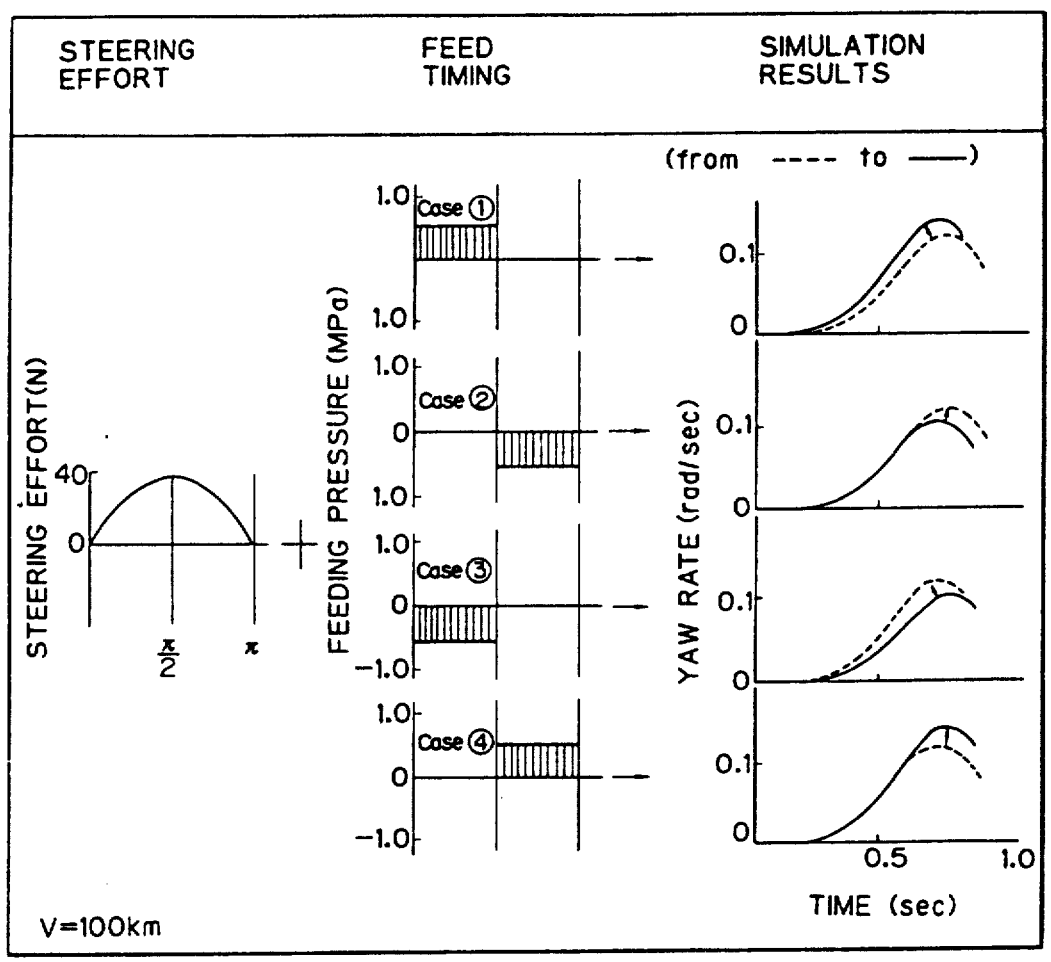
FIG. 8 is a compendium of graphs explaining study with regard to pressure oil injection timing by simulation.

Col. 4, line 16, change "avoids" to --avoid--; and
line 34, change "Fig. 6" to --Fig. 7--.

Col. 7, line 17, change ", and at" to --. At--; and
line 18, after "back" insert --, valves 18, 19--.

Col. 9, line 17, after ", of" insert --which--.

Col. 12, line 34, after ", and" insert --determines and calculates--.

Col. 13, line 55, change "since," to --,--.

Signed and Sealed this

Twenty-first Day of February, 1995

Attest:

BRUCE LEHMAN

Attesting Officer     Commissioner of Patents and Trademarks